United States Patent Office 2,922,773
Patented Jan. 26, 1960

2,922,773

NON-ELECTROSTATIC VINYLIDENE POLYMER MOLDING COMPOSITIONS DESTATICIZED WITH ALKYLENE OXIDE-ALKYLENE DIAMINE CONDENSATION PRODUCT

Myron A. Coler, Scarsdale, and Arnold S. Louis, Riverdale, N.Y.

No Drawing. Application March 30, 1956
Serial No. 574,960

9 Claims. (Cl. 260—32.6)

This invention relates to improved synthetic resin molding compositions and methods of making same and, in particular, to such molding materials which avoid the highly undesirable effects of electrostatic charge buildup during the molding operation.

It has been found that the process of molding certain synthetic resins causes the generation of high electrostatic charges. This evidences itself frequently by the formation of "crow's-feet," "fern-like" and "zig-zag" patterns through the attraction of fine dust particles from the atmosphere. Such patterns are sometimes erroneously interpreted as being molding flaws.

The literature discloses many additives for rendering synthetic resins destaticized. Many of such additives depend on the property of deliquescence to cause the article to be wetted by moisture from the air. The moisture renders the surfaces of the article sufficiently conductive to prevent the further accumulation of electrostatic charges. Molding operations are normally carried out at temperatures substantially in excess of the boiling point of water and, therefore, as molded, the molded article is relatively moisture free and thus subject to the accumulation of electrostatic charges at the time of molding.

Still other prior known additives which are inherently destaticizing agents tend to undesirably affect the physical properties of the plastic. For example, a lowering of the heat distortion point may occur, there may also be a change in color, gloss, hardness or water absorption characteristics, or blemishes may result from decomposition of additives or evaporation of low boiling fractions. The resulting product may also become toxic if the additive is in itself toxic.

Our invention, disclosed hereinafter, provides a plastic composition which avoids the disadvantages of acquiring electrostatic charges and in particular, which is not susceptible to electrostatic charging during the molding operation or upon release from the mold.

This invention does not depend on deliquescent action and, therefore, produces results substantially independent of humidity. This advantage of this invention is important in the elimination of the tendency for dust patterns to form on freshly molded plastic articles.

We have found that certain surface active agents prepared by the sequential addition of propylene and ethylene oxides to ethylene diamine may be incorporated into synthetic molding compositions to provide anti-static properties. The general family of addition products, described above, includes products differing widely as to the molecular weight of the hydrophobic condensation product which results from the initial reaction between propylene oxide and ethylene diamine and as to the weight percentage of hydrophilic oxyethylene units which are present in the final molecule. Among this group of compounds, we have found that those in which the molecular weight of the condensation product between ethylene diamine and propylene oxide is greater than 2,000 and in which the total addition product contains more than 60% by weight of oxyethylene groups, are especially useful for the purposes of this invention.

A totally unexpected advantage of the above named group of additives was discovered during molding tests of material prepared in accordance with this invention. It was found that the additives disclosed hereinafter, improved flow properties of the base plastic so as to permit shorter molding cycles as well as improved filling of thin mold sections, reduced breakage of thin-walled moldings and easier mold release were obtained.

An object of this invention is, therefore, to provide a method for eliminating the formation of electrostatic charges on molded plastic articles.

Another object is to provide a plastic molding composition having improved molding properties.

Still another object is to provide a plastic molding composition having preferred flow properties when injection molded.

A particular object is to provide a plastic material which is substantially non-susceptible to acquiring electrostatic charges.

A particular object of this invention is to provide a method for eliminating the formation of electrostatic charges on molded plastic articles during and especially immediately after the molding operation.

Another object is to provide articles comprising polystyrene compositions which are free of the effects of electrostatic charges.

Still another object of this invention is to provide an improved plastic composition and methods of making same.

A still different object is to reduce the electrostatic charge of polystyrene objects made by injection moldings.

It is a further object of this invention to provide anti-static molding compositions which are transparent.

A further object of this invention is to provide a polystyrene composition of superior molding properties.

Further objects and advantages will become apparent and still others will be pointed out with particularity as the following detailed description proceeds.

The compositions of this invention employ selected "additives" which are incorporated into synthetic resin compositions for the purpose of rendering the compositions anti-static.

By incorporating any of the above mentioned additives in polystyrene or other resinous polymers, the destaticizing properties are attained without incurring any of the undesirable features enumerated above. The quantity of additive employed is usually between 3% and 12% by weight, based on the total product and preferably between 4% and 7%. In the range of concentrations between 7% and 12%, slight cloudiness is noted in moldings made from the resulting composition. The upper limit is a matter of choice dictated by considerations of economy and is not critical. For example, 15% or more may be used and the desired destaticizing results obtained, although at higher concentrations there is danger of affecting physical properties adversely.

Be it observed that it will often be advantageous to prepare a master batch of resin with incorporated additive, said master batch containing far more additive than is recommended for use in molding operations and being later cut back by extrusion or by being otherwise blended with untreated resin. Such a concentrate may well be sold, particularly in the "clear" or "natural" color for blending with untreated resin of various colors or of its own color. The master batch may contain up to 50% of the additive.

By way of illustration, there are given hereinafter a number of examples wherein the additive, quantity of additive and the resinous polymer employed are varied. Since hundreds of combinations are possible, it becomes impractical to show more than a few typical compositions with additives so selected from the described group as to show operability of the group as a whole and therefore, such examples shall not be regarded as limiting in any sense.

Where it is desired to prepare a master batch or to market a concentrated blending material, the procedures of Examples 12 and 14 are preferred. In plants where mass polymerization is employed, the procedures of Examples 13 and 14 will be especially useful.

In cases where plastic chip is to be treated or where the polymerization methods in use are not adapted to taking advantage of the processes mentioned above, the process of Example 7 is preferred for its simplicity and freedom from extra drying steps.

Where it is desired to incorporate pigment in the plastic as well as to render it anti-static, the processes of Examples 1 and 2 are preferred. This procedure is claimed in our copending application entitled "Process for Making Plastic Compositions," Serial Number 532,132, filed September 2, 1955.

In carrying out this last referred to process, the additive is dissolved in a solvent which is a non-solvent for the plastics employed. The solution and plastic in comminuted form are then mixed together. The solvent is then removed so as to deposit the additive over the plastic particles.

In accordance with a particular example of this last mentioned procedure, from 0.1 to 0.7 lb. of the additive is dissolved in 1 lb. of isopropyl alcohol. Sufficient comminuted resinous polymer to make a total of 10 lbs. of additive plus polymer is mixed with the solution. The alcohol is then evaporated in an exhaust oven at 65° C. for 36 hours with occasional agitation, so as to leave the polymer granules uniformly coated with said additive.

The coated material is then fed through a Windsor type RC-65 twin-screw extruder equipped with a series of ⅛" square orifices. The die and barrel are maintained at a suitable temperature for the particular polymer, such as 400° F. for polystyrene. The extruded material may then be chopped up into molding granules.

The molding granules may then be injection molded, as for example on a Reed-Prentice 8-ounce injection molding press with a die temperature of 150° F. and a heater temperature of 550° F. for polystyrene. For other polymers, conventional molding temperatures prescribed by the polymer supplier may be employed.

As a test of the effectiveness of the additive, the resulting articles may be promptly sprayed with fine bentonite dust by means of a hand sprayer. The dust will collect in patterns on charged areas. Additional moldings may be set aside and observed periodically for several weeks. Using a Keithley electrostatic voltmeter, the potential may be measured between the molding and ground immediately after withdrawal from the mold.

As a control means, identical articles may be molded from the same polymer not using the additive.

*Example 1*

The foregoing procedure was carried out using the following composition:

The product of the sequential addition of propylene oxide and ethylene oxide to ethylene diamine wherein the molecular weight of the ethylene diamine-propylene oxide addition product is 3,600 to 4,500 and the final product contains 80% to 90% of ethylene oxide by weight, as manufactured by Wyandotte Chemicals Corp., Wyandotte, Michigan, under the trade name of "Tetronic 908," 0.5 lbs. Polystyrene granules, 10-60 mesh (Monsanto Chemical Corp., L2020 PIX-6), 9.5 lbs.

The dust test showed the absence of charged areas. The electrostatic voltmeter reading was about 1 volt.

One control article was sprayed with the bentonite dust immediately after molding and a well defined "fern-like" pattern was immediately apparent. The same control article yielded a 20 volt reading on the electrostatic voltmeter upon removal from the mold. After long term storage, another unmodified polystyrene molding showed definite dust patterns whereas the modified polystyrene article showed but a few isolated gravity deposited grains.

*Example 2*

The procedure of Example 1 was repeated with the exception that 0.1 gram of phthalocyanine blue was suspended in the alcohol and put through a colloid mill together with the additive prior to incorporation into the polystyrene. The resulting molded product was a uniform attractive pale blue color.

When tested as in Example 1, the molding and destaticizing characteristics were found to be identical to those of the treated product of Example 1.

*Example 3*

Example 1 was repeated with the same additive in a concentration of 3% by weight of the total product. The resulting molding exhibited poor non-electrostatic properties, as measured by the Keithley voltmeter. A small amount of dust was collected in patterns after storage for two weeks.

*Example 4*

Example 1 was repeated using 0.9 lb. of the same additive and 9.1 lbs. of polystyrene. A slight improvement in destaticizing properties was noted. The moldings were somewhat hazy as compared to those of Example 1.

*Example 5*

The procedure of Example 1 was repeated with an extruder barrel and die temperature of 375° F. utilizing 9.5 lbs. of polymethylmethacrylate as the resinous polymer. The resultant molding had substantially the same hardness as an unmodified control molding and exhibited excellent non-static and molding properties. The Keithley voltmeter reading was 1 volt directly after the molding operation.

*Example 6*

2.0 lbs. of isopropyl alcohol and 0.6 lb. of the product of the sequential addition of propylene oxide and ethylene oxide to ethylene diamine wherein the molecular weight of ethylene diaminepropylene oxide addition product is 2,500 to 3,000 and the final product contains 70% to 80% of ethylene oxide by weight, as manufactured by Wyandotte Chemicals Corp., Wyandotte, Michigan, under the trade name of "Tetronic 707" were mixed together to form a solution of watery consistency. The foregoing mixture was worked in a sigma blade mixer with 9.4 lbs. of polystyrene. After 15 minutes, the particles were found to be coated with the additive. The coated particles were then dried at 65° C. for 24 hours to remove the alcohol. The coated particles were then put through the extruder, chopped and molded as in Example 1. The resulting products showed substantially the same properties as the modified compositions of Example 1.

*Example 7*

0.6 lb. of the additive of Example 1 and 9.4 lbs. of polystyrene granules as used in Example 1 were thoroughly mixed in a sigma blade mixer. The mixture was then extruded, chopped and molded as in Example 1. The molded articles showed no discernible electrostatic charge as measured on the Keithley meter. The molded articles showed no tendency to collect dust in patterns during a 30-day storage test.

*Example 8*

The procedure of Example 7 was repeated using 9.4 lbs. of a so-called high impact polystyrene which was a plastic alloy of 85% polystyrene, 5% polybutadiene, 10% polyacrylonitrile and 0.6 lb. of the additive of Example 1.

The molded product was compared with a control specimen prepared in identical fashion with the exception that the additive was omitted. The two specimens were opaque in appearance. Immediately after molding, the treated material showed a charge of less than 1 volt whereas the unmodified control showed a charge of 18 volts.

*Example 9*

The procedure of Example 7 was repeated using 0.6 lb. of the additive of Example 1, 9.4 lbs. of polyvinyl chloride and a barrel and die temperature of 390° F. Injection molding was carried out at 400° F. The resulting molded articles were similar in appearance to unmodified polyvinyl chloride and exhibited excellent molding and anti-static properties. The electrostatic voltmeter test yielded a reading of about 2 volts whereas untreated polyvinyl chloride showed a reading of 20 volts upon molding.

*Example 10*

The procedure of Example 7 was repeated with an extruder barrel and die temperature of 350° F. utilizing 9.4 lbs. of ⅛" polyethylene pellets as the resinous polymer and 0.6 lb. of the additive of Example 1. Molding was carried out at a temperature of 350° F. Immediately after molding, a Keithley voltmeter reading of about 1.2 volts was noted. The control specimen showed a voltmeter reading of 25 volts.

*Example 11*

60 grams of the additive of Example 1 dissolved in 60 grams of water, were incorporated into 666 grams of polystyrene emulsion containing 30% polystyrene solids. 760 grams of granulated polystyrene were placed in a Baker-Perkins mixer. With the mixer in operation, the polystyrene emulsion additive mixture was slowly added. The resultant slurry was then dried at 65° C. for 48 hours at which time it was found to be water free. The resultant mixture which contained 6% of the additive, when molded as in Example 1, yielded moldings which when tested as in Example 1, exhibited destaticized characteristics similar to the modified product of Example 1.

*Example 12*

70 grams of the additive of Example 1 dissolved in 70 grams of water, was added to 400 grams of a 30% solids polystyrene emulsion. This mixture was spray dried and gave a free flowing polystyrene powder containing 1 part of the additive to 3 parts of polystyrene. The resultant concentrate was tumbled with 810 grams of a granulated polystyrene. The resultant blend was injection molded under conventional polystyrene molding conditions and yielded destaticized moldings having properties comparable to that produced by the procedures of Example 1.

*Example 13*

2.4 grams of α,α'-azodiisobutyronitrile was dissolved in 940 grams of monomeric styrene, 60 grams of the finely divided additive of Example 1 were dispersed in the resulting solution. The dispersion was placed in a heated agitated reaction kettle into which nitrogen was bubbled. The styrene dispersion was heated at 70° C. for 1½ hours until an exothermic reaction took place. The reaction was continued for an additional 30 minutes with the temperature being gradually increased to 90° C. until considerable polymerization took place as evidenced by an increase in viscosity. The mixture was transferred to air-free containers which were then sealed. The containers were maintained at a temperature of 90° C. for 48 hours. The resultant polymer was injection molded under normal polystyrene molding conditions. Moldings were clear and appeared equivalent to conventional polystyrene, except that when rubbed with a wool cloth, they would not become electrostatically charged as does unmodified polystyrene when so rubbed.

*Example 14*

2.0 grams of α,α'-azodiisobutyronitrile was dissolved in 800 grams of monomeric styrene. 200 grams of the additive of Example 1 in finely divided form, were dispersed in the resulting solution.

The solution was placed in a heated reaction kettle into which nitrogen was bubbled. The solution was heated at 70° C. for 1½ hours until an exothermic reaction took place. The reaction was continued for an additional 30 minutes during which the temperature was gradually increased to 90° C. Considerable polymerization took place as evidenced by an increase in viscosity. The mixture was transferred to air-free containers which were then sealed. The containers were maintained at a temperature of 90° C. for 48 hours. The resultant polymer was extruded and chopped into granules. Later, 300 grams of the granules were mixed with 700 grams of untreated polystyrene molding compounds and extruded, chopped and injection molded under normal conditions for polystyrene. The quality of the resulting moldings was similar to that of the moldings of Example 1.

For the purpose of illustrating the invention, examples have been shown of the application of our invention to plastic compositions of polystyrene, polyethylene, polyvinyl chloride and polymethylmethacrylate and their copolymers. We wish it to be understood that the invention likewise may be utilized in treating other polymers such as polyacrylonitrile, polyfluoroethylene, polytrifluoromonochloroethylene, polybutadienes, halogenated polystyrenes and mixtures and copolymers of these materials.

The term "vinylidene" as used herein is intended to define monomers containing a polymerizable unsaturated ethylenic $CH_2=C<$ structure and is generic to vinyl and vinylidene monomers. Each of the polymers specifically exemplified in the preceding examples, namely: polystyrene, polymethylmethacrylate, polyvinyl chloride and polyethylene is a polymer of a vinylidene monomer, so defined.

By "plastic alloy" as used herein, we intend to encompass compositions comprising two or more types of polymeric molecules whether prepared by copolymerization or by intimate mixing.

Mixtures of the various additives may be employed providing the total amount is within the disclosed proportions for a single specie.

While we have disclosed what is at present considered the best mode for carrying out our invention, we appreciate that it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. A composition of matter comprising an emulsion of a polymer of a vinylidene monomer and the product of the successive addition of propylene oxide and ethylene oxide to ethylene diamine wherein the initial addition product of propylene oxide with ethylene diamine has a molecular weight greater than 2,000 and less than about 4,500 and wherein said product of successive addition contains more than 60% and less than 90% by weight of ethylene oxide.

2. The composition of claim 1 wherein said polymer is polystyrene.

3. A composition of matter comprising a polymer of a vinylidene monomer and containing an antistatic agent consisting of between 3% and 12% by weight, based on the weight of the composition, of the product of successive additions of propylene oxide and ethylene oxide to ethylene diamine, to form an initial addition product between the propylene oxide and the ethylene diamine having a molecular weight greater than 2000 and less than about 4500 and a final product, after subsequent addition of ethylene oxide to the initial condensation product, containing between about 60% and 90% by weight of ethylene oxide.

4. The composition of claim 3 wherein said polymer is polystyrene.

5. The composition of claim 3 wherein said polymer is polyvinyl chloride.

6. The composition of claim 3 wherein said polymer is polymethyl methacrylate.

7. The composition of claim 3 wherein said polymer is polyethylene.

8. The composition of claim 3 wherein said polymer is a mixture of polymers selected from the group consisting of polystyrene, polyacrylonitrile and polybutadiene.

9. A composition of matter comprising a polymer of a vinylidene monomer and containing an antistatic agent consisting of between 4% and 7% by weight, based on the weight of the composition, of the product of sucessive additions of propylene oxide and ethylene oxide to ethylene diamine, to form an initial addition product between the propylene oxide and the ethylene diamine having a molecular weight greater than 2000 and less than about 4500 and a final product, after subsequent addition of ethylene oxide to the initial condensation product, containing between about 60% and 90% by weight of ethylene oxide.

References Cited in the file of this patent

UNITED STATES PATENTS 2,450,552    Hurdis _____ Oct. 5, 1948